United States Patent
Pink et al.

(10) Patent No.: US 9,971,349 B2
(45) Date of Patent: May 15, 2018

(54) METHOD AND DEVICE FOR MONITORING A SYSTEM OF A VEHICLE WHICH PROVIDES AN AT LEAST PARTIALLY AUTOMATED DRIVING FUNCTION

(71) Applicant: Robert Bosch GmbH, Stuttgart (DE)

(72) Inventors: Oliver Pink, Stuttgart (DE); Karsten Muehlmann, Stuttgart (DE); Armin Ruehle, Weinstadt (DE); Michael Helmle, Esslingen (DE); Christoph Schroeder, Pleidelsheim (DE); Rainer Baumgaertner, Pfaffenhofen (DE); Jeannine Schwarzkopf, Ludwigsburg (DE); Florian Hauler, Linkenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/309,987

(22) PCT Filed: Apr. 21, 2015

(86) PCT No.: PCT/EP2015/058554
§ 371 (c)(1),
(2) Date: Nov. 9, 2016

(87) PCT Pub. No.: WO2015/185258
PCT Pub. Date: Dec. 10, 2015

(65) Prior Publication Data
US 2017/0269600 A1    Sep. 21, 2017

(30) Foreign Application Priority Data

Jun. 3, 2014 (DE) .......................... 10 2014 210 485

(51) Int. Cl.
*G05D 1/02* (2006.01)
*B60W 30/14* (2006.01)
(Continued)

(52) U.S. Cl.
CPC ......... *G05D 1/0214* (2013.01); *B60W 30/095* (2013.01); *B60W 30/143* (2013.01);
(Continued)

(58) Field of Classification Search
CPC .. G05D 1/0214; G05D 1/0221; G05D 1/0223; B60W 30/095; B60W 30/143; B60W 50/0205; B60W 50/045
See application file for complete search history.

(56) References Cited

U.S. PATENT DOCUMENTS 9,302,678 B2 *   4/2016   Murphy ................ B60W 50/14

FOREIGN PATENT DOCUMENTS

DE   10102771 A1   7/2002
DE   102004047925 A1   4/2006
(Continued)

OTHER PUBLICATIONS

International Search Report dated Jul. 13, 2015, of the corresponding International Application PCT/EP2015/058554 filed Apr. 21, 2015.

*Primary Examiner* — Todd Melton
(74) *Attorney, Agent, or Firm* — Norton Rose Fulbright US LLP; Gerard Messina

(57) ABSTRACT

A method for monitoring a system of a vehicle which provides an at least partially automated driving function, including the following steps: checking a setpoint driving state of the vehicle, predefined by the system, for plausibility, controlling the vehicle as a function of the predefined setpoint driving state in order to reach the predefined setpoint driving state when a result of the check is that the (Continued)

predefined setpoint driving state is plausible, or controlling the vehicle as a function of an emergency setpoint driving state in order to reach the emergency setpoint driving state when a result of the check is that the predefined setpoint driving state is implausible. Moreover, a corresponding device, a corresponding monitoring system, and a corresponding computer program are described.

12 Claims, 2 Drawing Sheets

(51) Int. Cl.
*B60W 30/095* (2012.01)
*B60W 50/02* (2012.01)
*B60W 50/04* (2006.01)

(52) U.S. Cl.
CPC ...... *B60W 50/0205* (2013.01); *B60W 50/045* (2013.01); *G05D 1/0221* (2013.01); *G05D 1/0223* (2013.01); *B60W 2050/021* (2013.01)

(56) References Cited

FOREIGN PATENT DOCUMENTS

| | | |
|---|---|---|
| DE | 102011115854 A1 | 4/2013 |
| EP | 1616746 A2 | 1/2006 |
| EP | 2390862 A2 | 11/2011 |
| JP | H1139033 A | 2/1999 |
| JP | 2009061943 A | 3/2009 |
| JP | 2011186953 A | 9/2011 |

* cited by examiner

METHOD AND DEVICE FOR MONITORING A SYSTEM OF A VEHICLE WHICH PROVIDES AN AT LEAST PARTIALLY AUTOMATED DRIVING FUNCTION

FIELD

The present invention relates to a method and a device for monitoring a system which provides an at least partially automated driving function and/or an at least partially automated driving function of a vehicle. Moreover, the present invention relates to a system for monitoring a system which provides an at least partially automated driving function and/or an automated driving function of a vehicle, and a computer program.

BACKGROUND INFORMATION

Conventional driver assistance systems of vehicles may relieve the driver by taking over a portion of the driving task, for example the longitudinal or transverse guiding, from the driver. Automated driving functions are currently in development which completely take over the driving task. There is a need for preventing malfunctions of such systems resulting in the vehicle causing a collision or an accident.

SUMMARY

An object of the present invention may be regarded as providing a method for monitoring a system of a vehicle which provides an at least partially automated driving function, the method allowing recognition of a malfunction or a failure of the system so that the risk of an accident or a collision of the vehicle may be reduced.

Moreover, an object of the present invention may be regarded as providing a corresponding device for monitoring a system of a vehicle which provides an at least partially automated driving function.

Moreover, an object of the present invention may be regarded as providing a corresponding monitoring system for monitoring a system of a vehicle which provides an at least partially automated driving function.

Moreover, an object of the present invention may be regarded as providing a corresponding computer program.

Advantageous embodiments of the present invention are described herein.

According to one aspect, a method for monitoring a system of a vehicle which provides an at least partially automated driving function is provided, including the following steps:
  checking a setpoint driving state of the vehicle, predefined by the system, for plausibility,
  controlling the vehicle as a function of the predefined setpoint driving state in order to reach the predefined setpoint driving state when a result of the check is that the predefined setpoint driving state is plausible, or
  controlling the vehicle as a function of an emergency setpoint driving state in order to reach the emergency setpoint driving state when a result of the check is that the predefined setpoint driving state is implausible.

According to another aspect, a device for monitoring a system of a vehicle which provides an at least partially automated driving function is provided, including:
  an interface for receiving a setpoint driving state predefined by the system,
  a plausibility device for checking the received setpoint driving state of the vehicle for plausibility,
  an interface for outputting a result of the check that the predefined setpoint driving state is either plausible or implausible to a control device for controlling the vehicle based on the result, and/or for outputting the predefined setpoint driving state when the predefined setpoint driving state is plausible, or outputting an emergency setpoint driving state to an actuator system of the vehicle when the predefined setpoint driving state is implausible.

According to yet another aspect, a monitoring system for monitoring a system of a vehicle which provides an at least partially automated driving function is provided, including the device according to the present invention and the control device for controlling the vehicle based on the result, the control device including an interface for receiving the output result and being designed for deciding whether the vehicle should be controlled as a function of the setpoint driving state or as a function of the emergency setpoint driving state.

According to another aspect, a computer program is provided which includes program code for carrying out the method according to the present invention when the computer program is executed on a computer.

According to another aspect, a vehicle is provided which includes the device according to the present invention or the monitoring system according to the present invention.

According to one specific embodiment, the device is designed for carrying out the method according to the present invention. This applies similarly in particular for the monitoring system according to the present invention. This means that the method according to the present invention is preferably carried out with the aid of the device according to the present invention or with the aid of the monitoring system according to the present invention.

Specific embodiments with regard to the method result from specific embodiments with regard to the device or the monitoring system, and vice versa. Specific embodiments in conjunction with the method similarly apply for the monitoring system or the device, and vice versa.

The present invention includes in particular checking a setpoint driving state, which is predefined by a system of a vehicle which provides an at least partially automated driving function, for plausibility before the predefined setpoint driving state is transmitted to an actuator system of the vehicle and thus actually implemented. This means in particular that the setpoint driving state is checked for plausibility before it is actually implemented. The setpoint driving state is not actually implemented until the check has shown that the setpoint driving state is plausible. This means that in this case, the vehicle is controlled as a function of the predefined setpoint driving state in order to reach same. If the check has shown that the predefined setpoint driving state is not plausible, i.e., implausible, the setpoint driving state is not actually implemented. Instead, an emergency setpoint driving state is specified, and the vehicle is controlled as a function of the emergency setpoint driving state in order to reach same.

Due to the plausibility check, in particular the technical advantage is achieved that malfunctions or a failure of the system may be reliably recognized. This is because a malfunctioning or failed system is generally not able to specify a plausible setpoint driving state. Suitable countermeasures may thus be taken, in particular in this case, controlling the vehicle as a function of the emergency setpoint driving state when it has been recognized that the system has failed or has a malfunction. The risk of an accident or a collision may thus be advantageously reduced, and vehicle safety may advantageously be increased.

Controlling the vehicle includes in particular controlling guiding of the vehicle. Vehicle guiding may in particular include transverse guiding of the vehicle and/or preferably longitudinal guiding of the vehicle. This means that controlling the vehicle includes controlling the transverse guiding of the vehicle and/or, for example, controlling the longitudinal guiding of the vehicle.

Within the meaning of the present invention, the system is designed for providing an at least partially automated driving function. This means that the system may at least partially take over vehicle guiding. An at least partially automated driving function preferably includes in particular a driving function which assists the driver of the vehicle. This means that an assisting driving function assists the driver during transverse guiding and/or longitudinal guiding of the vehicle, for example. Such a system may preferably be referred to as a driver assistance system. An at least partially automated driving function preferably includes an automated driving function which completely takes over the vehicle guiding. This may also be referred to as a completely automated driving function. For better differentiation from systems which provide an assisting driving function, a system which provides an automated driving function may be referred to as a system for providing an automated driving function. Thus, in general a system is monitored which assists the driver in guiding the vehicle or completely takes over the vehicle guiding. Since it is ultimately monitored whether the provided driving function is correct, in the final analysis this may be referred to as monitoring of an at least partially automated driving function, preferably an automated driving function. Thus, preferably at least partially automated and/or completely automated and/or assisting driving functions are monitored. The system is thus appropriately designed for providing an automated and/or assisting driving function. In an automated driving function the vehicle is thus guided autonomously without driver intervention. This may thus also be referred to as an autonomous driving function.

According to one specific embodiment, it is provided that the check for plausibility includes comparing a setpoint driving state parameter which characterizes the setpoint driving state to a limiting driving state parameter, the result of the check being ascertained based on the comparison. This means that the system specifies, for example, the setpoint driving state parameter, which is compared to the limiting driving state parameter. Thus, for example, a check of maximum and/or minimum values may be carried out, i.e., whether the setpoint driving state parameter is larger or smaller than a predefined maximum or minimum value.

These maximum and minimum values are global maximum and minimum values, for example. For example, a setpoint driving state parameter may be an acceleration, a deceleration, or a time stamp of the setpoint driving state. Similarly, a global maximum value may be a maximum physically possible acceleration or deceleration, or a maximum allowable acceleration or deceleration of the function which the system provides (i.e., functionally related or specifically for the system), or the temporal limit of the prediction horizon. A check is carried out in particular for whether the time stamp of the driving state is in the past and/or is no farther in the future than the prediction horizon. This is because the time stamp of a plausible setpoint driving state is only in the future, not in the past, and in the future extends no further than the prediction horizon, i.e., is within the prediction horizon.

These maximum and minimum values are, for example, maximum values or minimum values which are a function of the driving state, for example a maximal physically possible transverse acceleration at a given speed, or a maximum allowable deceleration at a given speed. The setpoint driving state parameter (i.e., an acceleration or a deceleration, for example) is then correspondingly compared to these maximum values and minimum values which are a function of the driving state.

In one specific embodiment, multiple setpoint driving state parameters are provided. The statements made in conjunction with only one setpoint driving state parameter similarly apply for multiple setpoint driving state parameters, and vice versa. The setpoint driving state parameters are preferably the same or in particular different.

According to another specific embodiment, it is provided that environmental data which characterize the surroundings of the vehicle are received, the comparison being made based on the environmental data.

Environmental information is thus advantageously provided. Examples include weather conditions and coefficients of friction of the roadway. This environmental information may advantageously be used for an improved plausibility check, in particular for the above-mentioned check for maximum and/or minimum values. This is because different decelerations or accelerations are generally plausible or meaningful for different roadway conditions (slipperiness, wetness, dryness). The environmental data are preferably taken into account in the check for maximum and/or minimum values.

According to another specific embodiment, it is provided that the setpoint driving state includes a time stamp, the check for plausibility including a check for whether the time stamp is in the past and/or is no farther in the future than a prediction horizon, the result of the check being ascertained based on the check of the time stamp. As described above, a plausible setpoint driving state can always be only in the future, where it cannot be farther chronologically than a prediction horizon (i.e., within the prediction horizon), but in no case is it in the past.

In another specific embodiment, it is provided that the setpoint driving state includes a setpoint trajectory having a time curve of setpoint positions and setpoint speeds associated with the setpoint positions, the check for plausibility including a redundancy check for whether setpoint speeds correspond to a time derivative of the setpoint positions associated with these setpoint speeds, the result of the check being ascertained based on the redundancy check.

According to another specific embodiment, it is provided that the surroundings of the vehicle are detected by sensor, the check for plausibility including a check of the surroundings detected by sensor for whether at least one physically drivable collision-free trajectory exists in the surroundings detected by sensor, the result of the check being ascertained based on the check of the surroundings detected by sensor.

In another specific embodiment, it is provided that the surroundings of the vehicle are detected by sensor, the check for plausibility including a check of the surroundings detected by sensor for whether the setpoint driving state in the surroundings detected by sensor is collision-free, the result of the check being ascertained based on the check of the surroundings detected by sensor.

According to another specific embodiment, it is provided that the surroundings of the vehicle are detected by sensor.

According to another specific embodiment, it is provided that a sensor device for detecting the surroundings of the vehicle by sensor is provided.

According to another specific embodiment, it is provided that a digital map is received, the check for plausibility including comparing the setpoint driving state with the digital map, the result of the check being ascertained based on the comparison.

Such a digital map may be transmitted, for example, from a server to the vehicle. A digital map includes, for example, lane information and/or information concerning a traversable surface. A check is preferably made for whether the setpoint driving state, for example a setpoint trajectory, is within the instantaneous lane and/or within the traversable surface. This must be the case in a plausible setpoint driving state.

According to yet another specific embodiment, it is provided that data of another vehicle are received, the check for plausibility including comparing the setpoint driving state with the data of the other vehicle, the result of the check being ascertained based on the comparison.

Such data are so-called C2X data. For example, the other vehicle may transmit its position, i.e., position data, to the vehicle so that a collision check may be carried out based on the position data. Multiple vehicles are preferably provided which transmit their vehicle data, i.e., C2X data, in particular position data of the multiple vehicles, to the device or the system via a communication channel.

According to one specific embodiment, an interface for receiving data of another vehicle is provided.

According to one specific embodiment, an interface for receiving environmental data is provided.

According to one specific embodiment, an interface for receiving a digital map is provided.

The present invention is explained in greater detail below with reference to preferred specific embodiments.

DETAILED DESCRIPTION OF EXAMPLE EMBODIMENTS

Figure 1:
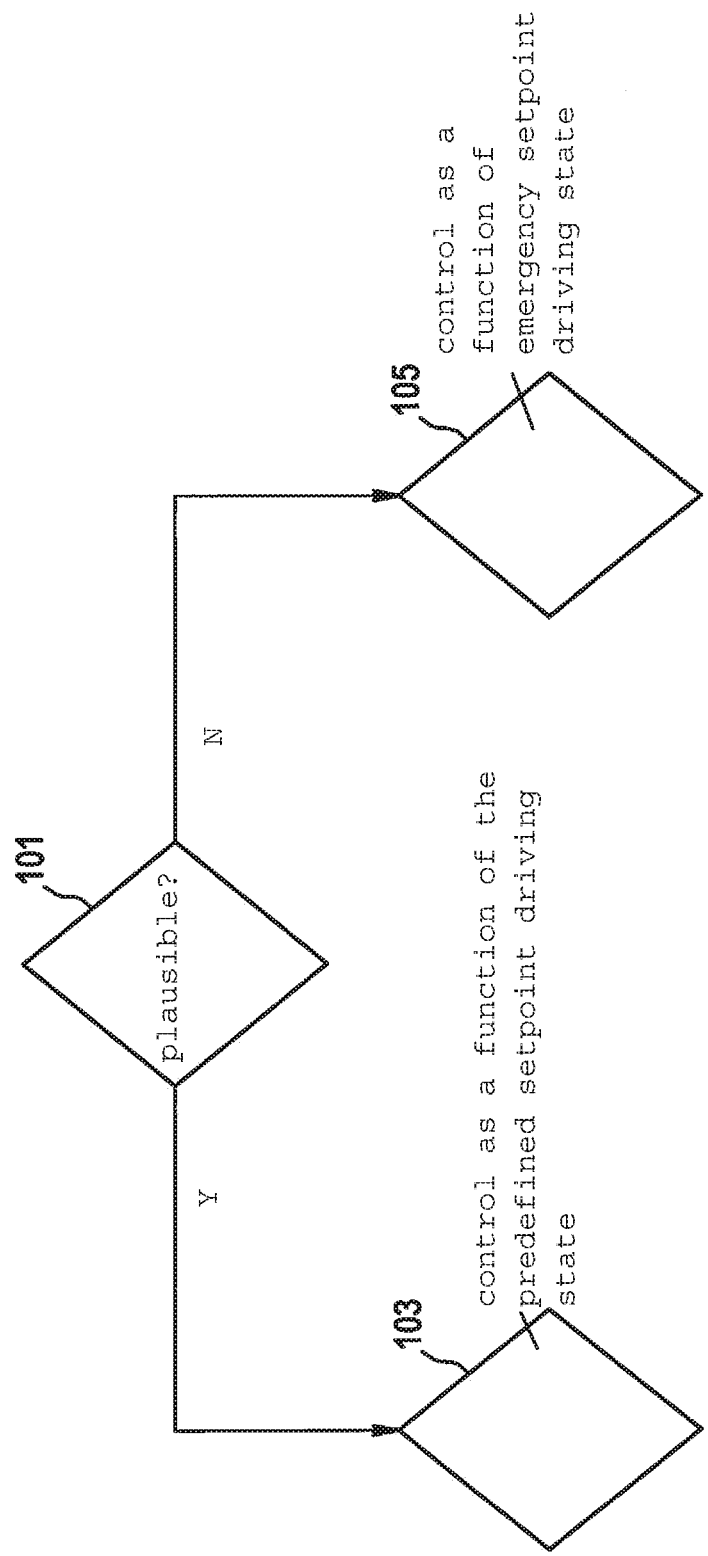
FIG. 1 shows a flow chart of a method for monitoring a system of a vehicle.
Figure 2:
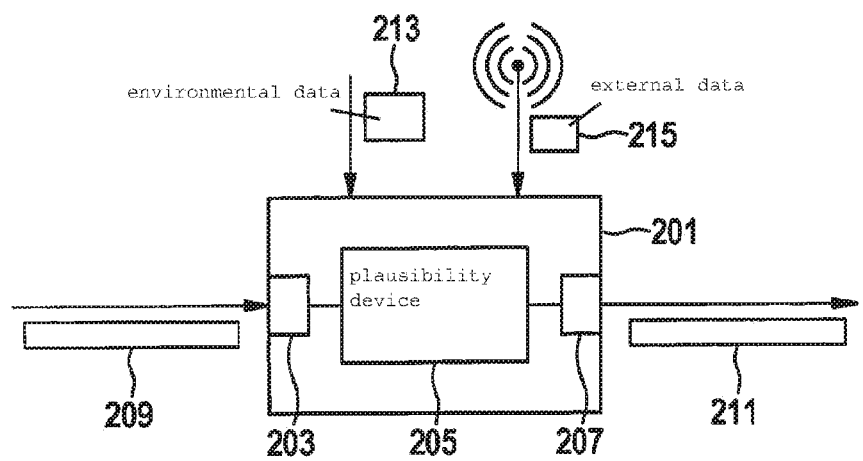
FIG. 2 shows a device for monitoring a system of a vehicle.
Figure 3:
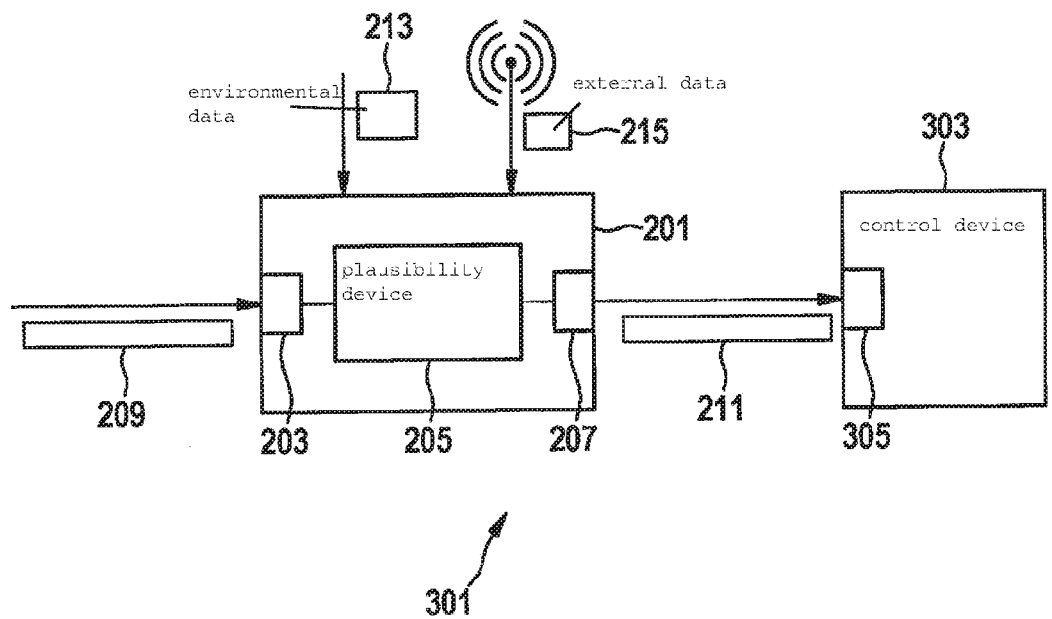
FIG. 3 shows a monitoring system for monitoring a system of a vehicle.

Below, the same reference numerals may be used for identical features.

FIG. 1 shows a flow chart of a method for monitoring a system of a vehicle.

A setpoint driving state of the vehicle is checked for plausibility in a step 101, the setpoint driving state having been predefined by a system of the vehicle which provides an at least partially automated driving function.

The vehicle is appropriately controlled based on the result of the check according to step 101. The vehicle is thus controlled as a function of the predefined setpoint driving state in a step 103 in order to reach the predefined setpoint driving state when a result of the check according to according to step 101 is that the predefined setpoint driving state is plausible. However, if the result of the check according to step 101 is that the predefined setpoint driving state is implausible, the vehicle is controlled as a function of an emergency setpoint driving state in a step 105 in order to reach the emergency setpoint driving state.

Controlling the vehicle as a function of the emergency setpoint driving state includes, for example, controlling the vehicle into a safe state. Controlling the vehicle into a safe state includes, for example, stopping the vehicle.

In particular one or more of the following criteria may be used for the decision of whether the predefined setpoint driving state is plausible or implausible:

1. or example, a model-based consistency and plausibility check of the setpoint driving state may be carried out. This requires no additional input data.
   a. check for maximum/minimum values, for example:
   i. global maximum values, for example maximal physically possible accelerations/decelerations, maximum allowable acceleration/deceleration of the function, time stamp of the driving state not in the past/not farther in the future than the prediction horizon
   ii. driving state-dependent maximum values, for example maximal physically possible transverse acceleration at a given speed, maximum allowable deceleration at a given speed.
   b. for setpoint trajectories: check of the sequence of setpoint driving states for consistency, for example:
   i. advancing time stamps; during a check of such a sequence, the particular time stamps of the setpoint driving states must advance,
   ii. "redundancy" on the physical level; for example, do the speeds in the setpoint states correspond to the derivatives of the positions?
   c. continuity of successive messages (such a message is predefined by the system and includes the setpoint driving state), for example:
   i. advancing time stamps, advancing message counters
   ii. the content of a message cannot be the same as one of the preceding messages (check via check sum, for example). This should never be the case, in particular when a time stamp is contained.
   iii. physical consistency of successive messages, for example continuously increasing setpoint variables.

What is claimed is:

1. A method for monitoring a system of a vehicle which provides an at least partially automated driving function, the method comprising:
   checking a setpoint driving state of the vehicle, predefined by the system, for plausibility;
   controlling the vehicle as a function of the predefined setpoint driving state in order to reach the predefined setpoint driving state when a result of the checking is that the predefined setpoint driving state is plausible; and
   controlling the vehicle as a function of an emergency setpoint driving state in order to reach the emergency setpoint driving state when a result of the checking is that the predefined setpoint driving state is implausible.

2. The method as recited in claim 1, wherein the checking for plausibility includes comparing a setpoint driving state parameter which characterizes the setpoint driving state to a limiting driving state parameter, the result of the checking being ascertained based on the comparison.

3. The method as recited in claim 1, wherein environmental data which characterize surroundings of the vehicle are received, the comparison being made based on the environmental data.

4. The method as recited in claim 1, wherein the setpoint driving state includes a time stamp, the check for plausibility including a check for at least one of: i) whether the time stamp is in the past, and ii) is no farther in the future than the prediction horizon, the result of the check being ascertained based on the check of the time stamp.

5. The method as recited in claim 1, wherein the setpoint driving state includes a setpoint trajectory which includes a time curve of setpoint positions and setpoint speeds associated with the setpoint positions, the check for plausibility including a redundancy check for whether setpoint speeds correspond to a time derivative of the setpoint positions associated with these setpoint speeds, the result of the check being ascertained based on the redundancy check.

6. The method as recited in claim 1, wherein the surroundings of the vehicle are detected by sensor, the check for plausibility including a check of the surroundings detected by sensor for whether at least one physically drivable collision-free trajectory exists in the surroundings detected by sensor, the result of the check being ascertained based on the check of the surroundings detected by sensor.

7. The method as recited in claim 1, wherein the surroundings of the vehicle are detected by sensor, the check for plausibility including a check of the surroundings detected by sensor for whether the setpoint driving state in the surroundings detected by sensor is collision-free, the result of the check being ascertained based on the check of the surroundings detected by sensor.

8. The method as recited in claim 1, wherein a digital map is received, the check for plausibility including comparing the setpoint driving state with the digital map, the result of the check being ascertained based on the comparison.

9. The method as recited in claim 1, wherein data of another vehicle are received, the check for plausibility including comparing the setpoint driving state with the data of the other vehicle, the result of the check being ascertained based on the comparison.

10. A device for monitoring a system of a vehicle which provides an at least partially automated driving function, the device comprising:
   an interface for receiving a setpoint driving state predefined by the system;
   a plausibility device for checking the received setpoint driving state of the vehicle for plausibility; and
   an interface for at least one of: i) outputting a result of the check that the predefined setpoint driving state is either plausible or implausible to a control device for controlling the vehicle based on the result, ii) outputting the predefined setpoint driving state when the predefined setpoint driving state is plausible, and iii) outputting an emergency setpoint driving state to an actuator system of the vehicle when the predefined setpoint driving state is implausible.

11. A monitoring system for monitoring a system of a vehicle which provides an at least partially automated driving function, the monitoring system comprising:
   a device including an interface for receiving a setpoint driving state predefined by the system, a plausibility device for checking the received setpoint driving state of the vehicle for plausibility, and an interface for at least one of: i) outputting a result of the check that the predefined setpoint driving state is either plausible or implausible to a control device for controlling the vehicle based on the result, ii) outputting the predefined setpoint driving state when the predefined setpoint driving state is plausible, and iii) outputting an emergency setpoint driving state to an actuator system of the vehicle when the predefined setpoint driving state is implausible; and
   a control device for controlling the vehicle based on the result, the control device including an interface for receiving the output result and designed for deciding whether the vehicle should be controlled as a function of the setpoint driving state or as a function of the emergency setpoint driving state.

12. A non-transitory machine readable storage medium on which is stored a computer program for monitoring a system of a vehicle which provides an at least partially automated driving function, the computer program, when executed by a processor, causing the processor to perform:
   checking a setpoint driving state of the vehicle, predefined by the system, for plausibility;
   controlling the vehicle as a function of the predefined setpoint driving state in order to reach the predefined setpoint driving state when a result of the checking is that the predefined setpoint driving state is plausible; and
   controlling the vehicle as a function of an emergency setpoint driving state in order to reach the emergency setpoint driving state when a result of the checking is that the predefined setpoint driving state is implausible.

* * * * *